US012623894B2

(12) United States Patent
Kim

(10) Patent No.: US 12,623,894 B2
(45) Date of Patent: May 12, 2026

(54) LOAD FALL PREVENTING SYSTEM FOR FORKLIFT

(71) Applicant: DOOSAN INDUSTRIAL VEHICLE CO., LTD., Incheon (KR)

(72) Inventor: Gwangwoo Kim, Incheon (KR)

(73) Assignee: DOOSAN BOBCAT KOREA CO., LTD., Incheon (KR)

( * ) Notice: Subject to any disclaimer, the term of this patent is extended or adjusted under 35 U.S.C. 154(b) by 157 days.

(21) Appl. No.: 18/532,301

(22) Filed: Dec. 7, 2023

(65) Prior Publication Data

US 2024/0300793 A1 Sep. 12, 2024

(30) Foreign Application Priority Data

Mar. 8, 2023 (KR) ........................ 10-2023-0030419

(51) Int. Cl.

*B66F 17/00* (2006.01)
*B66F 9/075* (2006.01)
*B66F 9/12* (2006.01)

(52) U.S. Cl.

CPC .......... *B66F 17/003* (2013.01); *B66F 9/0755* (2013.01); *B66F 9/12* (2013.01)

(58) Field of Classification Search

CPC .. B66F 17/003; G01G 19/083; B60G 2400/61
See application file for complete search history.

(56) References Cited

U.S. PATENT DOCUMENTS 4,511,974 A 4/1985 Nakane
5,986,560 A 11/1999 Rayburn
2012/0101684 A1 4/2012 Takazato
2019/0033158 A1* 1/2019 Bonnet .................... G01M 1/14
2020/0141790 A1* 5/2020 Van Den Berg ..... G01G 19/083
2021/0403103 A1* 12/2021 Alshaalan .............. B62D 37/04

FOREIGN PATENT DOCUMENTS

CN 103917477 A 7/2014
CN 209306896 U 8/2019
CN 111707342 A * 9/2020 ............. G01G 19/08
CN 112707338 A 4/2021
CN 115231476 A 10/2022

(Continued)

OTHER PUBLICATIONS

Combined Search and Examination Report issued in corresponding UK Patent Appln. No. GB2318577.0 on May 24, 2024, consisting of 7 pp.

(Continued)

*Primary Examiner* — Khoi H Tran

(74) *Attorney, Agent, or Firm* — Volpe Koenig

(57) ABSTRACT

Provided is a load fall preventing system for a forklift according to an exemplary embodiment of the present disclosure includes a load weight measuring unit 1 including a plurality of pressure sensors for measuring weight of a load loaded on a fork of a forklift, a risk determination unit 2 for determining a degree of risk of a loading situation of the load based on pressure information measured by the plurality of pressure sensors; and an operation unit 3 that performs an operation to prevent a fall of the load in accordance with the degree of risk of the loading situation determined by the risk determination unit.

10 Claims, 6 Drawing Sheets

(56) References Cited

FOREIGN PATENT DOCUMENTS

| | | | | | |
|---|---|---|---|---|---|
| CN | 218174567 | U | * | 12/2022 | .............. B66F 9/075 |
| JP | H06 156996 | A | | 6/1994 | |
| JP | H0649497 | U | * | 7/1994 | ................ B66F 9/19 |
| JP | 2012-020814 | A | | 2/2012 | |
| JP | 2022015592 | A | | 1/2022 | |
| JP | 7025109 | B2 | * | 2/2022 | ................ B66F 9/24 |
| KR | 101863309 | B1 | | 5/2018 | |
| KR | 102063579 | B1 | | 1/2020 | |
| KR | 20220022554 | A | | 2/2022 | |
| KR | 10-2022-0129267 | A | | 9/2022 | |

OTHER PUBLICATIONS

Search Report issued in corresponding EP Patent Appln. No. 23216511.8 on Jun. 11, 2024, consisting of 7 pp.

* cited by examiner

LOAD FALL PREVENTING SYSTEM FOR FORKLIFT

CROSS-REFERENCE TO RELATED APPLICATIONS

This application claims benefit and priority to Korean Patent Application No. 10-2023-0030419, filed on Mar. 8, 2023, with the Korean Intellectual Property Office, the disclosure of which is incorporated herein in its entirety by reference.

TECHNICAL FIELD

The present disclosure relates to a system for preventing a load fall of a forklift, and more particularly, to a system for preventing a load fall accident that may occur when a load of a forklift is tilted to one side or swayed when the forklift operates.

BACKGROUND

Forklifts are required to carry a wide variety of loads, and forklifts do not operate with only flat-shaped loads. Accordingly, it is common for a driver to drive a forklift with a load based on the driver's experience or visual perception when loading the load, and in this case, there is a high probability that the load will fall because the load is tilted to one side or swayed when the forklift operates.

To prevent such a fall of a load, Korean Patent Application Laid-Open No. 10-2022-0022554 (published on Feb. 28, 2022) discloses installation of a structure that prevents a load from falling as a prior art. Referring to FIG. 1, a forklift load fall preventing device according to the prior art includes a main body; an elevating part having a fixed frame part fixed to the main body, an elevating frame part installed to the fixed frame part to be elevatable; a towing part mounted to the elevating frame part, elevated upon elevation of the elevating frame part, and securing a load; and a fall preventing part mounted to the fixed frame part and preventing the load secured to the towing part from falling.

However, this prior art has a problem in that it is impossible to predict in advance the possibility of a load falling.

Accordingly, there is a need to develop a system for detecting a load condition in advance when a forklift loads or transports a load, and taking measures to prevent a fall of the load.

PRIOR ART LITERATURE

Patent Document

Korean Patent Application Laid-Open No. 10-2022-0022554 (published on Feb. 28, 2022)

SUMMARY

The present disclosure has been made in an effort to provide a system for preventing a load fall accident by detecting a loading situation in real time when a forklift loads or transports the load and notifying a driver of the loading situation or decreasing a forklift speed or stopping the forklift.

An exemplary embodiment of the present disclosure provides a system for preventing a load from falling for a forklift, the system including: a load weight measuring unit including a plurality of pressure sensors for measuring weight of a load loaded on a fork of a forklift; a risk determination unit for determining a degree of risk of a loading situation of the load based on pressure information measured by the plurality of pressure sensors; and an operation unit for performing an operation to prevent a fall of the load according to the degree of risk of the loading situation determined by the risk determination unit.

The forklift forks may be formed as a left and right pair, and the plurality of pressure sensors of the load weight measuring unit may be mounted in a plurality of compartmentalized regions compartmentalized in a longitudinal direction of each of the left and right pair of forks, respectively.

The risk determination unit may determine a loading position of the load based on the pressure information measured in real time from the plurality of pressure sensors, respectively.

The risk determination unit may determine a left-right balance state of the loaded load from the pressure information measured by the plurality of pressure sensors, respectively.

The risk determination unit may determine the degree of risk of the loading situation of the load based on the loading position of the load, the left-right balance state of the load, and the weight of the load measured by the load weight measuring unit.

The degree of risk of the loading situation may be categorized into a safe state, a cautionary state, and a warning state.

The safe state may correspond to the case where the load is unloaded because the load is weightless, or when the load is balanced on the left and right.

The cautionary state may correspond to the case where the load is not left and right balanced and is loaded with a bias toward one fork, but the load applied to the one fork is equal to or less than the maximum loaded load of the one fork, or when the load is left and right balanced, but the load equal to or greater than the maximum loaded load of all two forks is applied.

The warning state may correspond to the case where the load is not left and right balanced and is loaded with a bias toward one fork, but the load applied to the one fork is equal to or greater than the maximum loaded load of the one fork, where the left and right balanced state of the loaded load is in the cautionary state and the load equal to or greater than the maximum loaded load of all two forks is applied, or where a movement of the load in one direction by a certain threshold or more is detected during driving.

The degree of risk of the loading situation may be determined by assigning weight proportional to the closeness of the loading position of the load toward the end of the fork to the loaded load.

The degree of risk of the loading situation may be determined by assigning weight when the load is loaded while hanging from one fork.

The operation unit, in real time during the loading of the load and during an operation of a vehicle, may notify a forklift operator of the degree of risk of the loading situation, or slows down and stops the forklift, or restricts an operation of a forklift operating device.

The load fall preventing system for the forklift according to exemplary embodiment of the present disclosure has the effect of enabling uniform loading of the load during loading and preventing the load from falling during operation by in real time during the loading of the load and during the operation of the vehicle, informing a forklift operator of the degree of risk of the loading situation, or slowing down and stopping the forklift, or restricting the operation of the forklift operating device.

The foregoing summary is illustrative only and is not intended to be in any way limiting. In addition to the illustrative aspects, exemplary embodiments, and features described above, further aspects, exemplary embodiments, and features will become apparent by reference to the drawings and the following detailed description.

DETAILED DESCRIPTION

In the following detailed description, reference is made to the accompanying drawing, which forms a part hereof. The illustrative exemplary embodiments described in the detailed description, drawing, and claims are not meant to be limiting. Other exemplary embodiments may be utilized, and other changes may be made, without departing from the spirit or scope of the subject matter presented here.

Hereinafter, with reference to the drawings, an exemplary embodiment of a load fall preventing system for a forklift according to the present disclosure will be described in detail.

Figure 1:
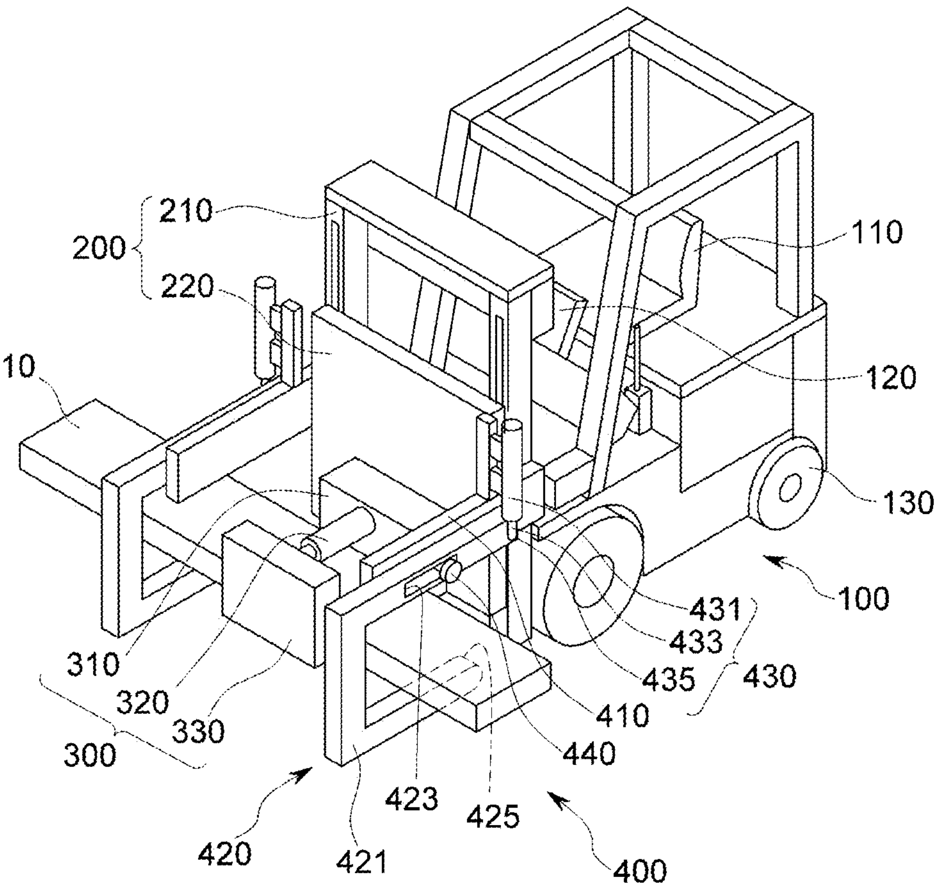
FIG. 1 is a diagram illustrating forklift load fall prevention according to the prior art.
Figure 2:
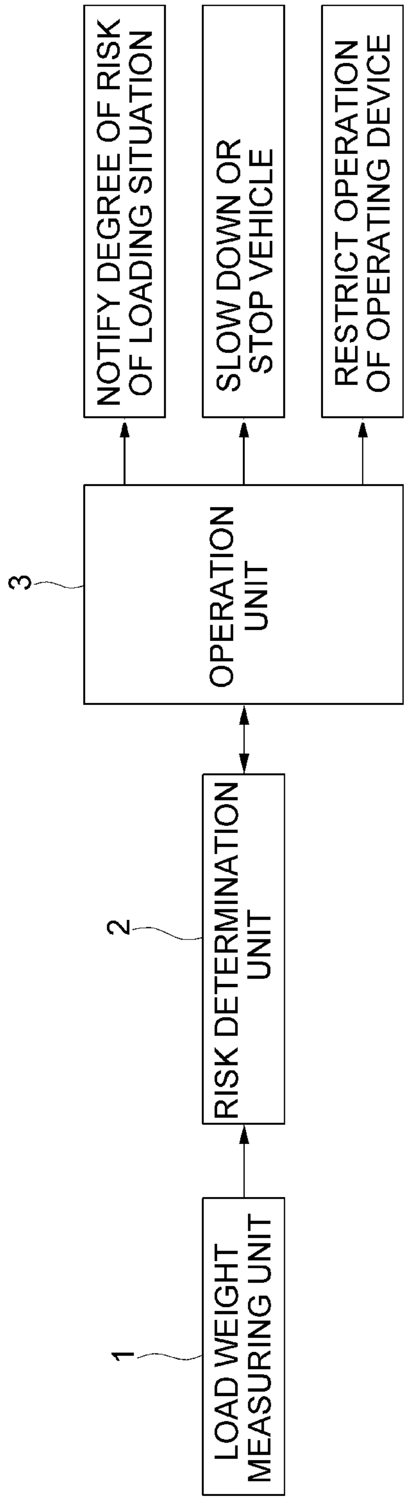
FIG. 2 is a diagram illustrating a configuration of a load fall preventing system for a forklift according to an exemplary embodiment of the present disclosure.

FIG. 2 is a diagram illustrating a configuration of a load fall preventing system for a forklift according to an exemplary embodiment of the present disclosure.

A load fall preventing system for a forklift according to an exemplary embodiment of the present disclosure includes a load weight measuring unit 1 including a plurality of pressure sensors for measuring weight of a load loaded on a fork of a forklift, a risk determination unit 2 for determining a degree of risk of a loading situation of the load based on pressure information measured by the plurality of pressure sensors; and an operation unit 3 that performs an operation to prevent a fall of the load in accordance with the degree of risk of the loading situation determined by the risk determination unit 2.

The forks of the forklift are generally formed as a left and right pair, and the plurality of pressure sensors of the load weight measuring unit are each mounted in a plurality of compartmentalized regions compartmentalized in a longitudinal direction of each of the left and right pair of forks.

The risk determination unit may determine the tilting or left-right balance state of the load, and the loading position of the load on the fork, from the respective pressure information measured in real time from the plurality of pressure sensors installed in the fork compartments.

The risk determination unit determines a degree of the risk of the loading situation of the load based on the tilting or left and right balance state of the load, the loading position of the load on the fork, and the weight of the load measured by the load weight measuring unit.

By informing a driver in advance of the determined degree of risk of the loading situation, the driver may load the load on the fork relatively evenly when loading the load from an initial time.

When the load is at risk of falling, such as due to swaying caused by a forklift operation, driving on an unpaved road, and driving on an inclined road, the system may notify the driver of the degree of risk of the loading situation to prevent a load falling accident, or may actively slow down or stop the vehicle to prevent the load from falling.

Figure 3:
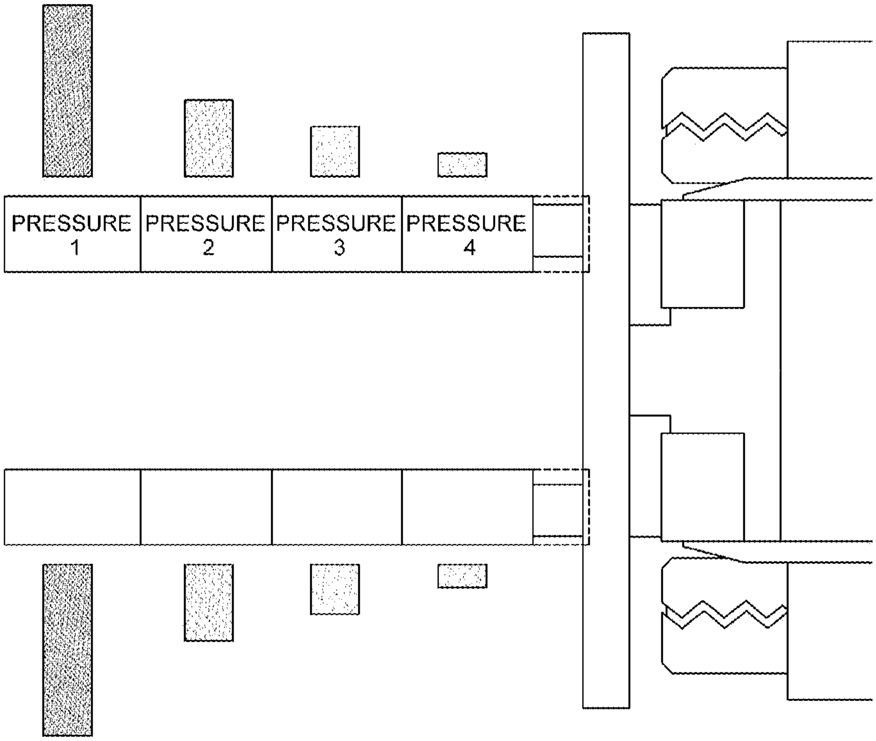
FIG. 3 is a diagram illustrating a load loaded at a fork end in the load fall preventing system of the forklift according to the exemplary embodiment of the present disclosure.
Figure 4:
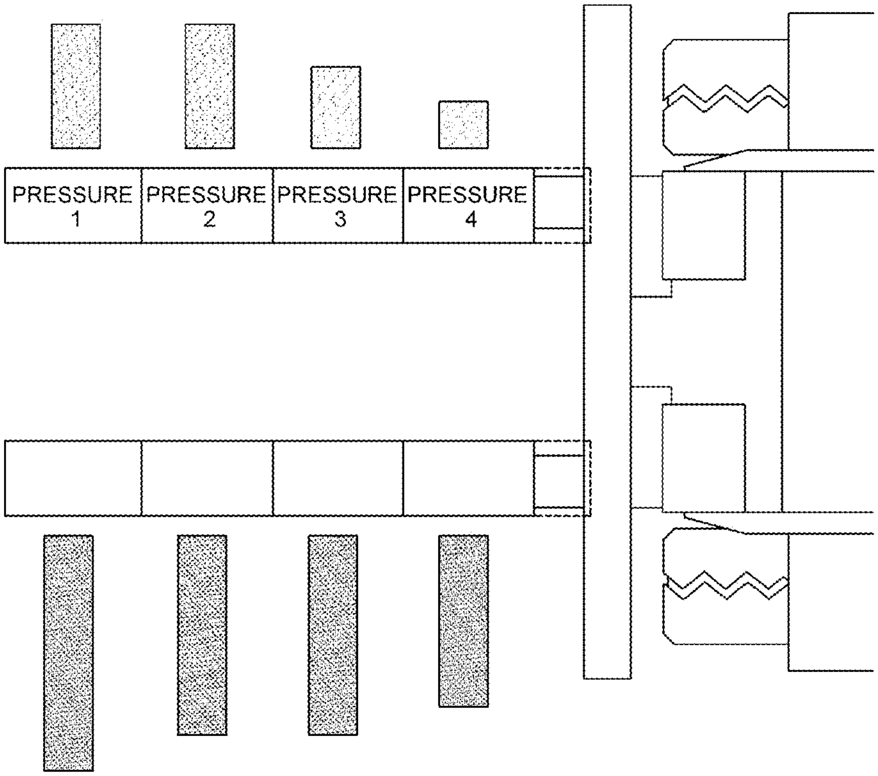
FIG. 4 is a diagram illustrating a load loaded biased toward one fork in the load fall preventing system for the forklift according to the exemplary embodiment of the present disclosure.

FIG. 3 is a diagram illustrating a load loaded at a fork end in the load fall preventing system of the forklift according to the exemplary embodiment of the present disclosure, and FIG. 4 is a diagram illustrating a load loaded while being biased toward one fork in the load fall preventing system for the forklift according to the exemplary embodiment of the present disclosure.

In the case of FIG. 3, where the load is loaded at the front where the fork end is located, the pressure distribution measured for each compartment where the plurality of pressure sensors is located shows that the greatest pressure is detected at the fork end.

In the case of FIG. 4, where the load is loaded while being biased toward one fork (the left one when viewed from the driver's seat), and the pressure distribution measured for each compartment shows that the left fork has a concentrated large pressure.

As described above, the pressure distribution measured in each compartment of the fork may indicate the position where the load is loaded, whether the load is tilting, or whether the load is balanced. Of course, from the measured pressures of the plurality of pressure sensors, the total load of the load may be known, and the load applied to a single fork may be known.

The loading situation degree of risk may be categorized into a safe state, a cautionary state, and a warning state.

The safe state corresponds to the case where the load is unloaded because the load is weightless, or when the load is balanced left and right.

The cautionary state corresponds to the case where the load is not left and right balanced and is loaded with a bias toward one fork, but the load applied to the one fork is equal to or less than the maximum loaded load of the one fork, or when the load is left and right balanced, but the load equal to or greater than the maximum loaded load of all two forks is applied.

The warning state corresponds to the case where the load is not left and right balanced and is loaded with a bias toward one fork, but the load applied to the one fork is equal to or greater than the maximum loaded load of the one fork, where the left and right balanced state of the loaded load is in the cautionary state and the load equal to or greater than the maximum loaded load of all two forks is applied, or where a movement of the load in one direction by a certain threshold or more is detected during driving.

Meanwhile, the degree of risk of the loading situation may be determined by assigning weight proportional to the close of the loading position of the load toward the end of the fork to the loaded load.

Figure 5:
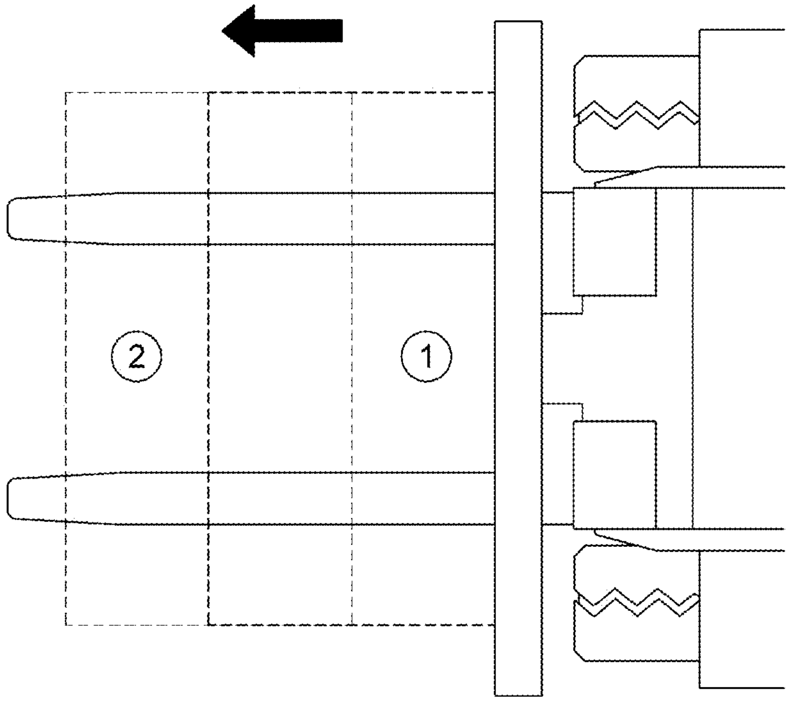
FIG. 5 is a diagram illustrating a loading state of a load in the load fall preventing system for the forklift according to the exemplary embodiment of the present disclosure.

FIG. 5 is a diagram illustrating a loading state of a load in the load fall preventing system for the forklift according to the exemplary embodiment of the present disclosure. In FIG. 5, in both loading states ① and ②, the load is safely loaded with the load balanced left and right, but even if the load is of the same weight, the load in the load state ② is loaded in a more precarious position than the load state ①, so it is desirable to assign weight to the load state ② to determine the degree of risk of the loading situation.

Figure 6:
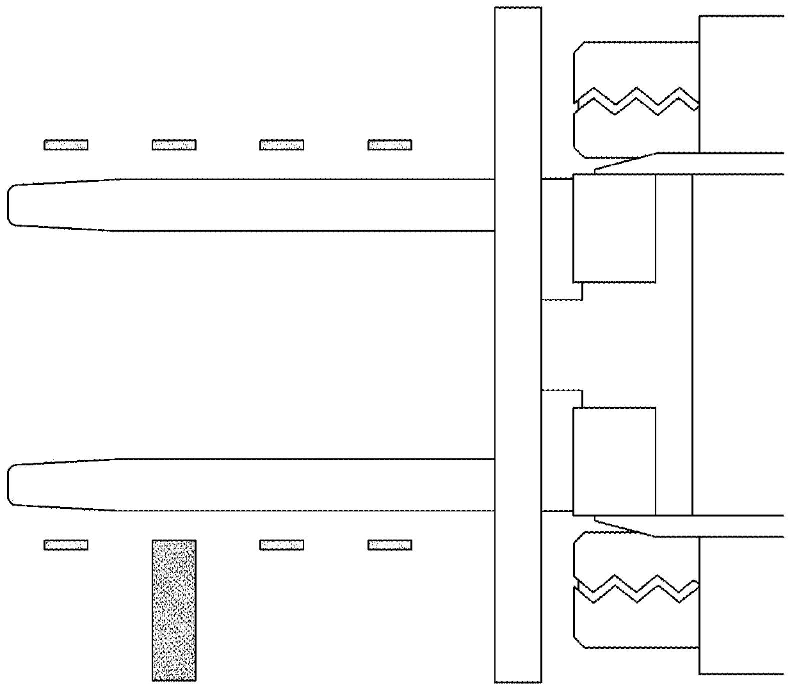
FIG. 6 is a diagram illustrating a load loaded while hanging from a fork on one side of a forklift in the load fall preventing system of the forklift according to the exemplary embodiment of the present disclosure.

FIG. 6 is a diagram illustrating a load loaded while hanging from a fork on one side of a forklift in the load fall preventing system of the forklift according to the exemplary embodiment of the present disclosure. This state indicates the case where a large pressure is concentratedly measured on a portion of the left fork when viewed by the driver, and this case is determined as the case where the load hangs from the left fork. It is desirable to determine the degree of risk of the loading situation by assigning weight of the load, since the load is more likely to fall when the load is loaded while hanging from one fork.

The operation unit, in real time during the loading of the load and during the operation of the vehicle, informs a forklift operator of the degree of risk of the loading situation, or slows down and stops the forklift, or restricts the operation of the forklift operating device. This allows for uniform loading of the load during loading, and prevents the load from falling when the forklift operates.

The above description is merely an exemplary description of the technical ideas of the present disclosure, and various modifications, changes, and substitutions will be apparent to one of ordinary skill in the art to which the present disclosure belongs without departing from the essential features of the invention.

Accordingly, the exemplary embodiments are intended to illustrate, not limit, the technical ideas of the present disclosure, and the scope of the technical ideas of the present disclosure is not limited by the exemplary embodiment. The scope of protection of the present disclosure shall be construed in accordance with the following claims, and all technical ideas within their scope shall be construed to be included in the scope of the present disclosure.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A system for preventing a load from falling for a forklift, the system comprising:

a load weight measuring unit including a plurality of pressure sensors for measuring weight of a load loaded on a fork of a forklift;

a risk determination unit for determining a degree of risk of a loading situation of the load based on pressure information measured by the plurality of pressure sensors and an assigned weight based on a load location; and an operation unit for performing an operation to prevent a fall of the load according to the degree of risk of the loading situation determined by the risk determination unit, wherein the degree of risk of the loading situation is determined by assigning weight proportional to the closeness of the loading position of the load toward the end of the fork to the loaded load, or by assigning weight when the load is loaded while hanging from one fork.

2. The system of claim 1, wherein the forklift forks are formed as a left and right pair, and the plurality of pressure sensors of the load weight measuring unit is mounted in a plurality of compartmentalized regions compartmentalized in a longitudinal direction of each of the left and right pair of forks, respectively.

3. The system of claim 2, wherein the risk determination unit determines a loading position of the load based on the pressure information measured in real time from the plurality of pressure sensors, respectively.

4. The system of claim 3, wherein the risk determination unit determines a left-right balance state of the loaded load from the pressure information measured by the plurality of pressure sensors, respectively.

5. The system of claim 4, wherein the risk determination unit determines the degree of risk of the loading situation of the load based on the loading position of the load, the left-right balance state of the load, and the weight of the load measured by the load weight measuring unit.

6. The system of claim 5, wherein the degree of risk of the loading situation is categorized into a safe state, a cautionary state, and a warning state.

7. The system of claim 6, wherein the safe state corresponds to the case where the load is unloaded because the load is weightless, or when the load is balanced left and right.

8. The system of claim 7, wherein the cautionary state corresponds to the case where the load is not left and right balanced and is loaded with a bias toward one fork, but the load applied to the one fork is equal to or less than the maximum loaded load of the one fork, or when the load is left and right balanced, but the load equal to or greater than the maximum loaded load of all two forks is applied.

9. The system of claim 8, wherein he warning state corresponds to the case where the load is not left and right balanced and is loaded with a bias toward one fork, but the load applied to the one fork is equal to or greater than the maximum loaded load of the one fork, where the left and right balanced state of the loaded load is in the cautionary state and the load equal to or greater than the maximum loaded load of all two forks is applied, or where a movement of the load in one direction by a certain threshold or more is detected during driving.

10. The system of claim 9, wherein the operation unit, in real time during the loading of the load and during an operation of a vehicle, informs a forklift operator of the degree of risk of the loading situation, or slows down and stops the forklift, or restricts an operation of a forklift operating device.

* * * * *